(12) United States Patent
Muramatsu et al.

(10) Patent No.: US 7,911,933 B2
(45) Date of Patent: Mar. 22, 2011

(54) INFORMATION RECORDING LAYER OF OPTICAL DISC AND OPTICAL DISC

(75) Inventors: Eiji Muramatsu, Saitama (JP); Kazuo Kuroda, Saitama (JP)

(73) Assignee: Pioneer Corporation, Tokyo (JP)

( * ) Notice: Subject to any disclaimer, the term of this patent is extended or adjusted under 35 U.S.C. 154(b) by 599 days.

(21) Appl. No.: 11/887,428

(22) PCT Filed: Mar. 3, 2006

(86) PCT No.: PCT/JP2006/304161
§ 371 (c)(1),
(2), (4) Date: Nov. 30, 2007

(87) PCT Pub. No.: WO2006/112178
PCT Pub. Date: Oct. 26, 2006

(65) Prior Publication Data
US 2008/0291804 A1    Nov. 27, 2008

(30) Foreign Application Priority Data
Mar. 31, 2005 (JP) .................................. 2005-102307

(51) Int. Cl.
*G11B 7/24* (2006.01)
(52) U.S. Cl. ........................................................ 369/288
(58) Field of Classification Search .................. None
See application file for complete search history.

(56) References Cited

U.S. PATENT DOCUMENTS

| | | | | |
|---|---|---|---|---|
| 5,876,820 A * | 3/1999 | Koike et al. | ............... | 428/64.1 |
| 6,045,889 A * | 4/2000 | Fukano et al. | ............... | 428/64.1 |
| 6,335,071 B1 * | 1/2002 | Fukano et al. | ............... | 428/64.1 |
| 6,337,117 B1 | 1/2002 | Maenosono et al. | | |
| 7,313,080 B2 * | 12/2007 | Shiono et al. | ............... | 369/275.1 |
| 2005/0157629 A1 | 7/2005 | Shiono et al. | | |
| 2008/0205256 A1 * | 8/2008 | Kubo et al. | ............... | 369/283 |

FOREIGN PATENT DOCUMENTS

| | | |
|---|---|---|
| JP | 54-054606 A | 5/1979 |
| JP | 62-151394 A | 7/1987 |
| JP | 62-246789 A | 10/1987 |
| JP | 3-42275 A | 2/1991 |
| JP | 5-159354 A | 6/1993 |
| JP | 6-103611 A | 4/1995 |
| JP | 2000-155981 A | 6/2000 |
| JP | 2003-109247 A | 4/2003 |
| WO | WO 03/085657 A1 | 10/2003 |

OTHER PUBLICATIONS

U.S. Appl. No. 11/887,373, filed Sep. 28, 2007, Muramatsu et al.

* cited by examiner

*Primary Examiner* — Mark Blouin
(74) *Attorney, Agent, or Firm* — Foley & Larnder LLP

(57) ABSTRACT

An optical disk includes a substrate covered with an information recording layer. The information recording layer includes a recording material and a dispersion material dispersed in the recording material. The recording material absorbs recording light for recording information, and then generates heat. As the light refraction index of the recording material changes due to the heat generation, information is recorded on the recording material. The dispersion material has lower absorptance of the recording light and lower thermal conductivity than the recording material, and an external dimension smaller than a diffraction limit of reading light for reading information.

5 Claims, 7 Drawing Sheets

INFORMATION RECORDING LAYER OF OPTICAL DISC AND OPTICAL DISC

TECHNICAL FIELD

The present invention relates to an information recording layer of an optical disk on which information is recorded with light, and the optical disk.

BACKGROUND ART

Recently, an optical disk, such as a CD (Compact Disc) or a DVD (Digital Versatile Disk), on which a user can record information, so-called a write-once optical disk, is widely used. Such optical disk is provided with, for example, as disclosed in Patent Document 1, an information recording layer that is an optical absorption layer made of dye, and information is recorded by irradiating recording light to the information recording layer, then decomposing dye in an area irradiated with the light, and forming a recording mark.
Patent Document 1: Japanese Patent Application Laid-Open No. H6-103611

DISCLOSURE OF INVENTION

Problem to be Solved by the Invention

However, on a conventional optical disk as disclosed in Patent Document 1, a single information recording layer absorbs light and then generates heat. Therefore, it is difficult to control a thermal distribution of the information recording layer when irradiated with the light, and also it is difficult to form a fine recording mark.

The present invention has been achieved to solve the above problems in the conventional technology and it is an object of the present invention to provide an information recording layer of an optical disk and the optical disk capable to achieve high density recording by forming a fine recording mark.

Means for Solving Problem

According to an aspect of the present invention, an information recording layer of an optical disk includes a recording material that absorbs recording light for recording information and generates heat, and on which information is recorded as a light refraction index changes due to generated heat; and a heat-transfer restricting portion that is dispersed in the recording material, and that has lower absorptance of the recording light than the recording material, an external dimension smaller than a diffraction limit of reading light for reading information, and lower thermal conductivity than the recording material.

BRIEF DESCRIPTION OF DRAWINGS

FIG. 10-1 is a schematic diagram for explaining a process of forming a recording mark that carries information on an optical disk according to an embodiment.
FIG. 10-2 is a schematic diagram for explaining the process of forming the recording mark that carries information on the optical disk according to the embodiment.
FIG. 10-3 is a schematic diagram for explaining the process of forming the recording mark that carries information on the optical disk according to the embodiment.

Figure 1:
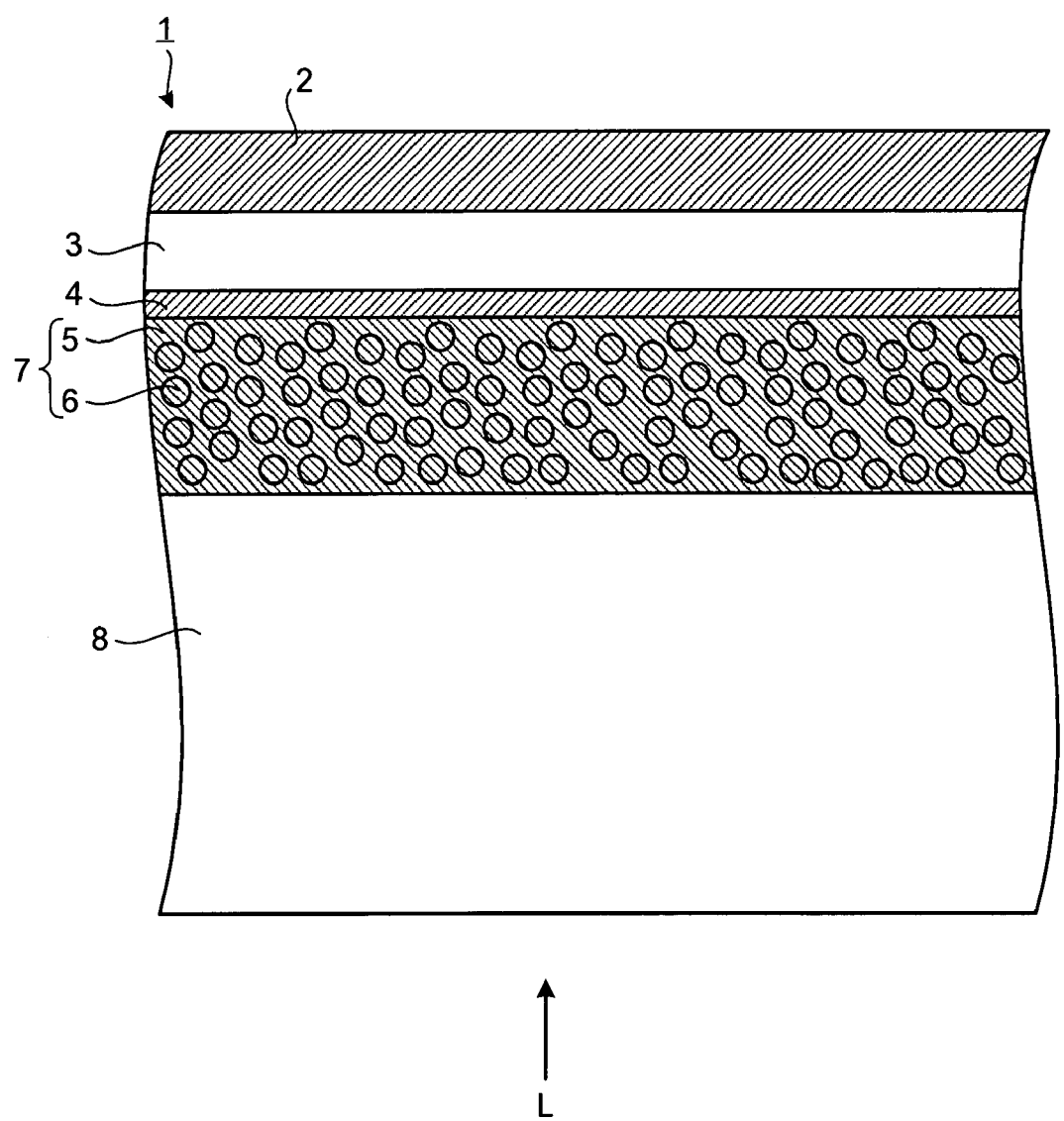
FIG. 1 is a schematic diagram of a configuration of an optical disk according to an embodiment.

EXPLANATIONS OF LETTERS OR NUMERALS 1, 1a Optical disk
3 Protective layer
4 Reflective layer
5, 5a Recording material
6 Exothermic material
6a Dispersion material
7, 7a Information recording layer
8 Substrate
10 Disk device
11 Processing unit
12 Driver
13 Optical pickup

BEST MODE(S) FOR CARRYING OUT THE INVENTION

Exemplary embodiments of the present invention are explained in detail below with reference to the accompanying drawings. Note that the present invention is not limited to the embodiments, but is to be construed as embodying all modifications and alternative constructions that may occur to one skilled in the art which fairly fall within the basic teaching herein set forth. The present invention can be applied to at least an information-recordable optical disk having an information recording layer in a single or multilayer.

First Embodiment

According to the first embodiment, the information recording layer of an optical disk includes an exothermic material and a recording material. The exothermic material absorbs recording light and then generates heat; and has an external dimension smaller than the diffraction limit of reading light. The recording material has lower absorptance of a wavelength of the recording light than the exothermic material. On the recording material, information is recorded as the refraction index of the recording material decreases with heating. The exothermic material is dispersed in the recording material.

FIG. 1 is a schematic diagram of a configuration of an optical disk according to the first embodiment. In an optical disk 1, an information recording layer 7 is formed on the surface of a substrate 8 made of a transparent resin. On the information recording layer 7, information is recorded with light (recording light) L, which has a specific wavelength. The information recording layer 7 includes an exothermic material 6, for example, formed from an organic dye into particles, which are dispersed in a recording material 5 such as an organic dye. A configuration of the information recording layer 7 is explained in detail below.

On the surface of the information recording layer 7, a reflective layer 4 made of a metal having a high reflectance, for example, aluminum, is formed. On the surface of the reflective layer 4, a protective layer 3 for protecting the information recording layer 7 and the reflective layer 4 formed on the surface of the substrate 8 is formed. The surface of the protective layer 3 is a label surface 2, on which a sticker recorded with characters and/or an image is to be labeled, or characters and/or an image are to be directly printed.

Figure 2:
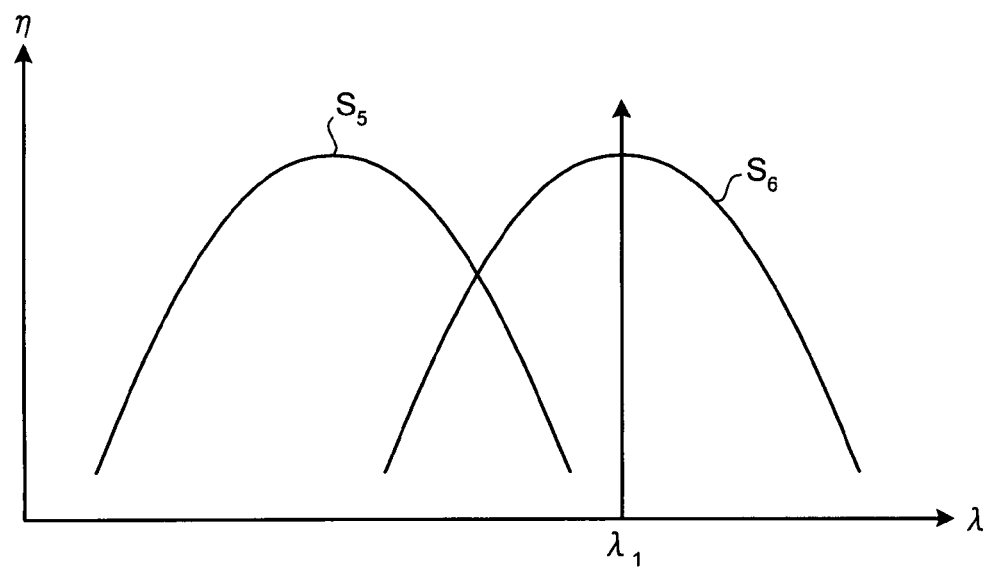
FIG. 2 is a chart for explaining a relation between wavelengths of recording light and optical absorptance of materials that form an information recording layer of the optical disk according to the embodiment.
Figure 3:
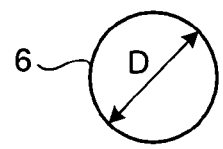
FIG. 3 is a schematic diagram for explaining an exothermic material that forms the information recording layer of the optical disk according to the embodiment.

FIG. 2 is a chart for explaining a relation between wavelengths of the recording light and optical absorptance of materials that form the information recording layer of the optical disk according to the first embodiment. FIG. 3 is a schematic diagram for explaining the exothermic material that forms the information recording layer of the optical disk according to the first embodiment. A solid line $S_5$ shown in FIG. 2 indicates a relation between optical absorptance of the recording material 5 and wavelengths, and a solid line $S_6$ indicates a relation between optical absorptance of the exothermic material 6 and wavelengths.

The exothermic material 6 included in the information recording layer 7 absorbs the recording light and then generates heat. The recording light is the light L for recording information on the optical disk 1. The light L has a wavelength $\lambda_1$ of, for example, about 500 nanometers to 700 nanometers. An external dimension D of the exothermic material 6 is set to a smaller value (about 20 nanometers to 100 nanometers) than the diffraction limit of reading light. Although the exothermic material 6 is dispersed in the recording material 5, a shadow of the exothermic material 6 cannot be read with the reading light upon reading of information recorded on the optical disk 1 because the external dimension D of the exothermic material 6 is set in this way.

Usually, the wavelength of the recording light and that of the reading light are in common. The external dimension D of the exothermic material 6 is the dimension of the largest portion of a piece of the exothermic material. If the exothermic material 6 is spherical as shown in FIG. 3, the external dimension D is a maximum diameter Dmax. By ensuring that the external dimension D of the exothermic material 6 is made smaller than the diffraction limit of the reading light, influence on information reading caused by dispersing the exothermic material 6 in the recording material 5 can be more securely suppressed. The exothermic material 6 can be obtained by forming, for example, an organic dye that absorbs light of a specific wavelength, into particles having an external dimension of about 20 nanometers to 100 nanometers.

The recording material 5 that forms the information recording layer 7 included in the optical disk 1 according to the first embodiment is a material that is configured to decompose by being heated and to decrease its refraction index. Accordingly, the recording material 5 has a function of recording information on the information recording layer 7.

The recording material 5 has the exothermic material 6 dispersed therein, and becomes a parent phase of the information recording layer 7. Optical absorptance $\eta$ of the recording material 5 differs from that by the exothermic material 6. As shown in FIG. 2, the optical absorptance $\eta$ of recording light with the wavelength $\lambda_1$ by the recording material 5 is lower than that by the exothermic material 6, and the recording material 5 does not absorb the recording light with the wavelength $\lambda_1$. Even if the recording material 5 absorbs the recording light with the wavelength $\lambda_1$, an extent of absorption is extremely minute. Consequently, if the recording light is irradiated to the recording material 5 not containing the exothermic material 6, the recording material 5 does not generate heat and its refraction index does not decrease. Accordingly, information is not to be recorded.

Examples of the exothermic material 6 and the recording material 5 that form the information recording layer 7 of the optical disk according to the first embodiment include organic dye, such as cyanine dye, diazo, dye, and phthalocyanine dye. As the exothermic material 6, for example, a material expressed in a formula 1 can be used. As the recording material 5, for example, a material expressed in a formula 2 can be used. The materials expressed in Formulas 1 and 2 are both cyanine dyes, but different in structure from each other. A peak wavelength of light absorbed by the exothermic material 6 is about 620 nanometers to 700 nanometers, while a peak wavelength of light absorbed by the recording material 5 is about 400 nanometers to 480 nanometers. Thus, the information recording layer 7 of the optical disk 1 according to the first embodiment can be configured by using two kinds of materials that absorb lights in different wavelength bands.

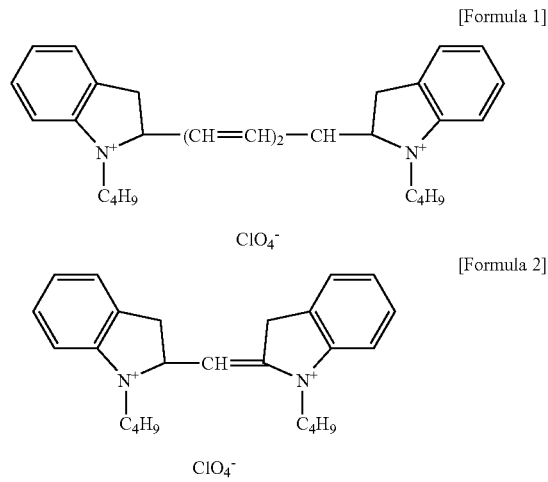

Figure 4:
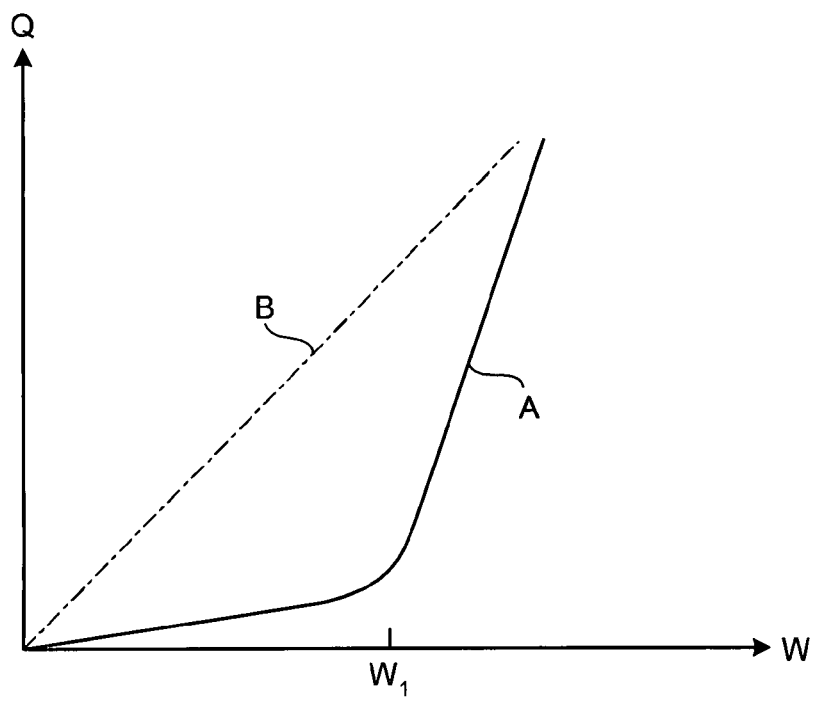
FIG. 4 is a chart for explaining a relation between intensity of recording light to be irradiated and an amount of heat generated by the exothermic material according to the embodiment.

FIG. 4 is a chart for explaining a relation between intensity of the recording light to be irradiated and an amount of heat generated by the exothermic material according to the first embodiment. According to the first embodiment, the exothermic material 6 that forms the information recording layer 7 preferably has a characteristic that an amount of heat generation Q varies non-linearly with respect to light intensity W of the recording light $L_R$ to be irradiated, as indicated by a solid line A in FIG. 4. Thus, only the exothermic material 6 irradiated with the recording light $L_R$ beyond a threshold $W_1$ of the light intensity generates heat, so that unwanted heat generation caused by irradiation of other than the recording light $L_R$ can be restricted. The exothermic material that forms the information recording layer 7 can has a characteristic that the amount of heat generation Q varies linearly with respect to the light intensity W of the recording light to be irradiated, as indicated by a dash-dot line B in FIG. 4.

Figure 5:
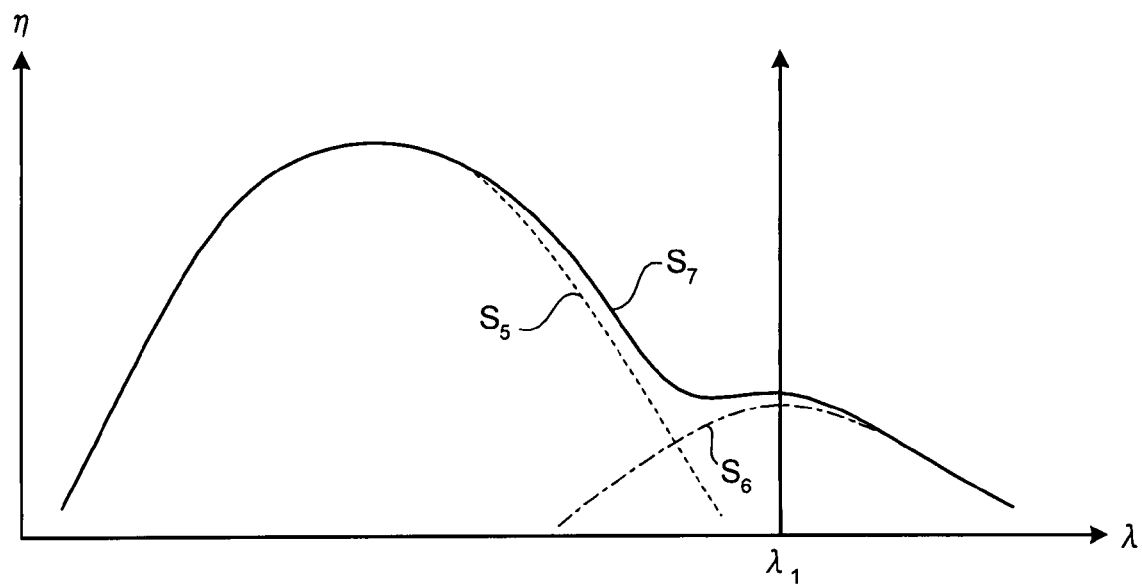
FIG. 5 is a chart for explaining a relation between optical absorptance and wavelengths in the information recording layer according to the embodiment.

FIG. 5 is a chart for explaining a relation between optical absorptance and wavelengths in the information recording layer according to the first embodiment. The optical absorptance of the information recording layer 7 according to the first embodiment changes as with a combination (a solid line $S_7$ shown in FIG. 5) of change in the optical absorptance of the exothermic material 6 (a dash-dot line $S_6$ shown in FIG. 5) and change in the optical absorptance of the recording material 5 (a dotted line $S_5$ shown in FIG. 5). The optical absorptance of the information recording layer 7 can be changed by changing a mixing volume ratio of the exothermic material 6 to the recording material 5. If containing a high proportion of the exothermic material 6, the optical absorptance η in the vicinity of the wavelength $\lambda_1$ of the recording light is large. When information is read from the information recording layer 7, reflection in the information recording layer 7 is small, and there is a possibility that information reading may be influenced.

For this reason, the mixing volume ratio of the exothermic material 6 to the recording material 5 is adjusted within a range to obtain a sufficient amount of heat required for the recording material 5 to decompose upon recording of information. From this point of view, the volume proportion of the exothermic material 6 in the information recording layer 7 of the optical disk 1 is preferably made smaller than the volume proportion of the recording material 5 in the information recording layer 7 of the optical disk 1. In an example shown in FIG. 5, the exothermic material and the recording material are in a volume ratio of approximately 1:5, i.e., the exothermic material:the recording material=1:5.

Accordingly, the optical absorptance η in the vicinity of the wavelength $\lambda_1$ of the recording light is made small, while the optical absorptance η of wavelengths other than the wavelength $\lambda_1$ of the recording light is made large. As a result, while securing a sufficient amount of heat required for the recording material 5 to decompose during the information recording, a shortage of reflection during the information reading is prevented as the optical absorptance of the information recording layer 7 shown in FIG. 5. When heat generated by the exothermic material 6 needs to be adjusted, it can be adjusted by adjusting the mixing volume ratio of the exothermic material 6 to the recording material 5, or adjusting the ratio between a surface area S and a volume V of the exothermic material.

Figure 6:
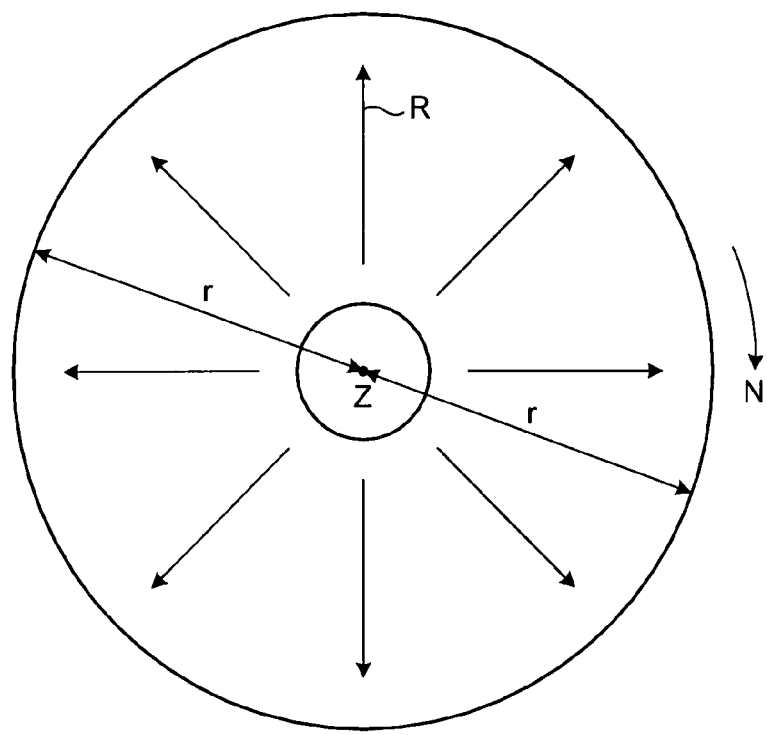
FIG. 6 is a plane view of an optical disk according to the embodiment.

FIG. 6 is a plane view of an optical disk according to the first embodiment. The optical disk 1 is a CAV (Constant Angular Velocity) disk, on which the distribution of heat generation in the information recording layer 7 can be increased by elevating a volume proportion of the exothermic material 6 (increasing the distribution density of the exothermic material 6) in the information recording layer 7 in a direction radially outwardly from a center of rotation Z (towards the perimeter in the direction of an arrow R in FIG. 6). The optical disk 1 of the CAV type rotates in the direction of an arrow N shown in FIG. 6. As a radius r at an irradiation position (recording position) of the recording light $L_R$ is getting larger, the linear velocity is getting higher, consequently, an irradiation time of the recording light $L_R$ is getting shorter. For this reason, as the heat generation density in the information recording layer 7 is made higher on the radially outer side, it is ensured that the exothermic material 6 generates heat even when the linear velocity on the optical disk 1 becomes high, so that recording is performed on the information recording layer 7. Likewise, on a ZCAV (Zone Constant Angular Velocity) disk, or a ZCLV (Zone Constant Linear Velocity) disk, the distribution density of the exothermic material 6 can be set based on the linear velocity. Alternatively, if the optical disk 1 is a CLV (Constant Linear Velocity) disk, the exothermic material 6 can be distributed uniformly.

Figure 7:
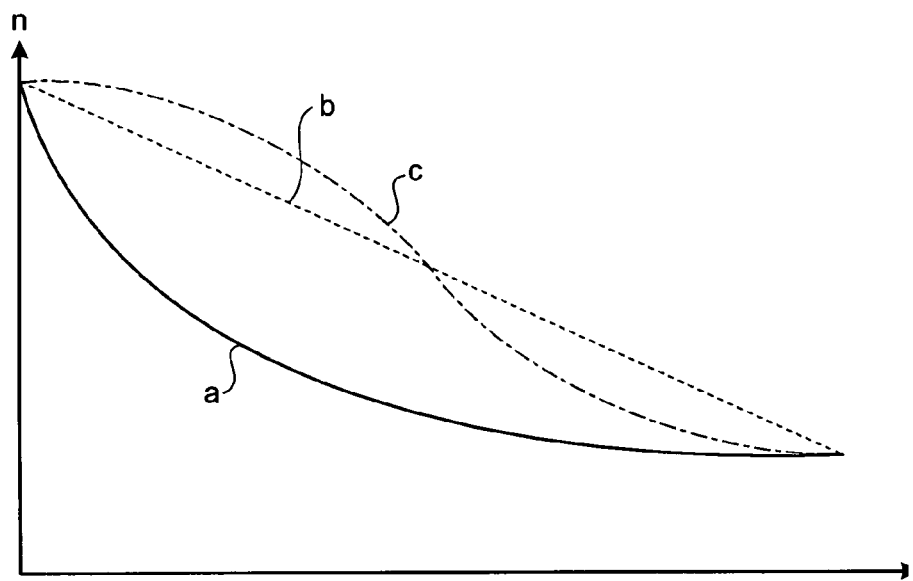
FIG. 7 is a chart for explaining an example of a method of forming the information recording layer of the optical disk according to the embodiment.

FIG. 7 is a chart for explaining an example of a method of forming the information recording layer of the optical disk according to the first embodiment. FIG. 7 presents changes in the number of revolutions of the substrate after a coating liquid is applied when the information recording layer 7 of the optical disk 1 is formed by spin coating. The information recording layer 7 of the optical disk 1 can be formed by applying a coating liquid made of the exothermic material 6 and the recording material 5 dissolved in a solvent to the substrate 8 (FIG. 1) being rotating, i.e., so-called spin coating.

For the optical disk 1 according to the first embodiment, when the coating liquid is applied to the substrate 8, as shown in FIG. 7, the number of revolutions n of the substrate 8 is gradually decreased over the course of time, for example, as with changes indicated by a solid line a in FIG. 7. Accordingly, the density of the exothermic material 6 can be made higher towards the radially outer side of the optical disk 1. Consequently, the density of heat generation in the information recording layer 7 can be increased in a direction radially outwardly of the optical disk 1. The changes in the number of revolutions n of the substrate 8 are not limited to the changes indicated by the solid line a in FIG. 7, but can be changes indicated by a dotted line b or a dash-dot line c shown in FIG. 7. The changes in the number of revolutions n of the substrate 8 can be changed as required depending on a concentration of the coating liquid or a material of the substrate 8. In the next description, an apparatus for recording and reproducing information on and from the optical disk 1 according to the first embodiment is explained.

Figure 8:
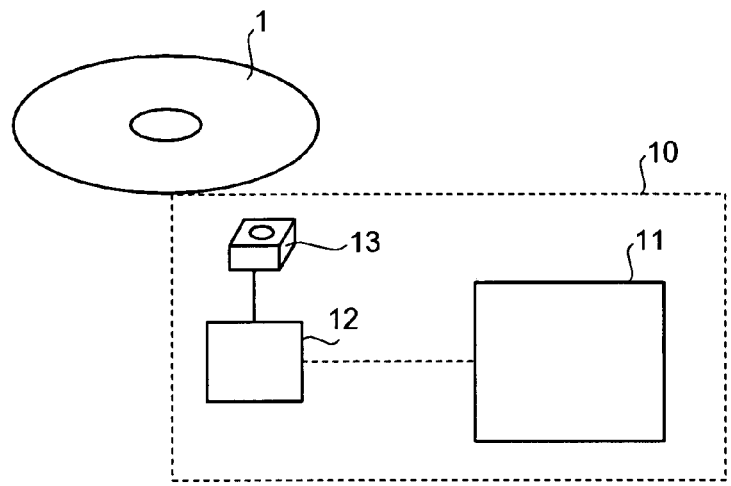
FIG. 8 is a structural diagram of an example of an apparatus for recording and reproducing information on and from the optical disk according to the embodiment.
Figure 9:
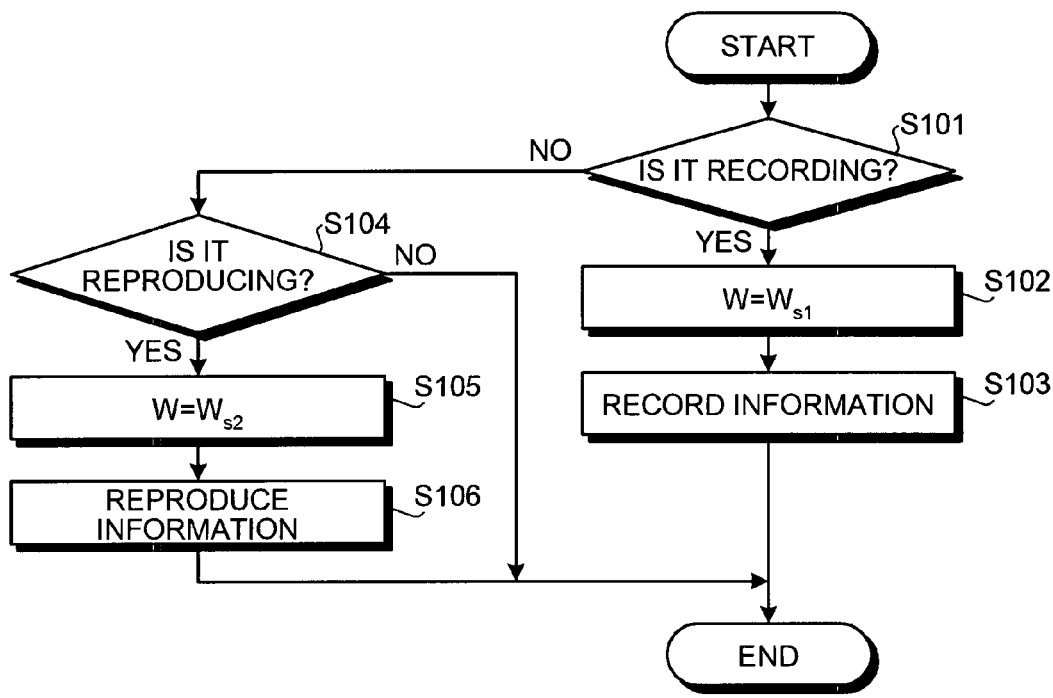
FIG. 9 is a flowchart of a procedure of a method of recording and reproducing information on and from the optical disk according to the embodiment.

FIG. 8 is a structural diagram of an example of an apparatus for recording and reproducing information on and from the optical disk according to the first embodiment. FIG. 9 is a flowchart of a procedure of a method of recording and reproducing information on and from the optical disk according to the first embodiment. An apparatus (hereinafter, "disk device") 10 records and reproduces information on and from the optical disk 1 according to the first embodiment. The disk device 10 includes an optical pickup 13, a driver 12, and a processing unit 11. The optical pickup 13 is for recording and reproducing information on and from the optical disk 1. The driver 12 controls the operations of the optical pickup 13. The processing unit 11 sends a signal to control the optical pickup 13 to the driver 12, and controls recording and reproduction operated by the optical pickup 13.

According to the embodiment, when information is to be recorded or reproduced on or from the optical disk 1, the processing unit 11 of the disk device 10 determines whether information is to be recorded on the optical disk 1 (step S101). If information is to be recorded on the optical disk 1 (Yes at step S101), the processing unit 11 sets, to a certain value $W_{s1}$, the light intensity W of the recording light to be irradiated to the information recording layer 7 of the optical disk 1 from a light source, such as a laser diode, included in the optical pickup 13 (step S102). The driver 12 is then controlled such that the optical pickup 13 irradiates the information recording layer 7 with the recording light at the light intensity, and the recording light irradiates the information recording layer 7 of the optical disk 1. Accordingly, the exothermic material 6 in the information recording layer 7 generates heat, and the recording material 5 is decomposed. Thus, a recording mark is formed on the information recording layer 7, and information is recorded on the information recording layer 7 (step S103).

If information is not to be recorded on the optical disk 1 (No at step S101), the processing unit 11 determines whether information recorded on the optical disk 1 is to be reproduced (step S104). If information recorded on the optical disk 1 is not to be reproduced (No at step S104), the processing is terminated. If information recorded on the optical disk 1 is to be reproduced (Yes at step S104), the processing unit 11 sets, to a certain value $W_{s2}$, the light intensity W of the reading light to be irradiated to the information recording layer 7 of the optical disk 1 from the light source, such as the laser diode, included in the optical pickup 13 (step S105). The certain values herein are in relation of $W_{s1} > W_{s2}$, and each of the values is set based on the relation shown in FIG. 4 between the amount of heat generated by the exothermic material and the light intensity of the recording light $L_R$ to be irradiated.

This is because there is a possibility that reading the information in the information recording layer 7 with light intensity higher than or equal to the light intensity W at the time of the recording (higher than or equal to $W_{s1}$) may cause the exothermic material 6 in the information recording layer 7 to generate heat, which may cause the recording material 5 to decompose. Therefore, the light intensity $W_{s2}$ of the reading light is set at least lower than the light intensity $W_{s1}$ at the time of recording. If the exothermic material 6 has a characteristic that the amount of heat generation Q varies non-linearly with respect to the light intensity W of the recording light $L_R$ to be irradiated as explained in connection with FIG. 4, light intensity lower than the threshold $W_1$ of the light intensity, below which the amount of heat generation is extremely small, is preferable as the light intensity $W_{s2}$ of the reading light.

After the light intensity W of the reading light is set to the certain value $W_{s2}$ (step S105), the processing unit 11 controls the driver 12 such that the optical pickup 13 irradiates the information recording layer 7 with the reading light at the light intensity $W_{s2}$, and the reading light irradiates the information recording layer 7 of the optical disk 1. Accordingly, the processing unit 11 discriminates differences in refraction indexes between a recording mark recorded on the information recording layer 7 and an area other than the recording mark based on a signal detected by the optical pickup 13, and reproduces the information recorded on the information recording layer 7 (step S106).

As described above, according to the first embodiment, the information recording layer 7 of the optical disk 1 includes the exothermic material 6 and the recording material 5. The exothermic material 6 absorbs recording light for recording information and then generates heat, and has the external dimension D smaller than the diffraction limit of the reading light. The recording material 5 has lower absorptance of a wavelength of the recording light than the exothermic material 6. On the recording material 5, information is recorded as the light refraction index of the recording material 5 changes with heating. The exothermic material 6 is dispersed in the recording material 5.

Thus, the total amount of heat generation can be reduced from that in the conventional case, and the dispersion of heat can be restricted because the heat sources are scattered. As a result, a recording mark finer than that on the conventional optical disk can be formed on the information recording layer 7 included in the optical disk 1 according to the first embodiment. Moreover, according to the first embodiment, a fine recording mark can be formed without changing the wavelength of the recording light, the aperture of a lens that forms an optical system, and the like. Therefore, configurations of a light source and a device do not need to be changed, so that high density recording can be achieved by forming fine recording marks without changing the design of a recording device. The configuration according to the first embodiment can also be applied to the following embodiment.

Second Embodiment

According to a second embodiment, the information recording layer of an optical disk includes a recording material and heat-transfer restricting portions. On the recording material, information is recorded as the refraction index of the recording material decreases with heating. An exothermic material is dispersed in the recording material. The heat-transfer restricting portions have lower absorptance of the recording light than the recording material, an external dimension smaller than the diffraction limit of reading light, and a lower thermal conductivity than the recording material.

Figures 1, 10:
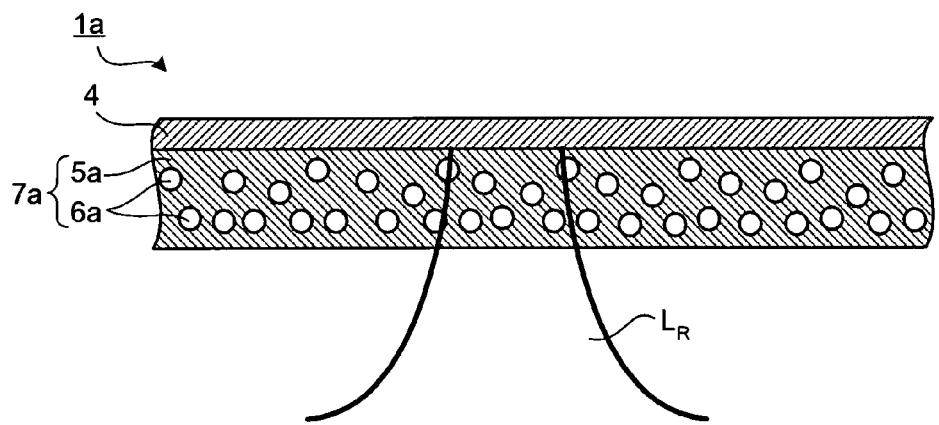
Figures 2, 10:
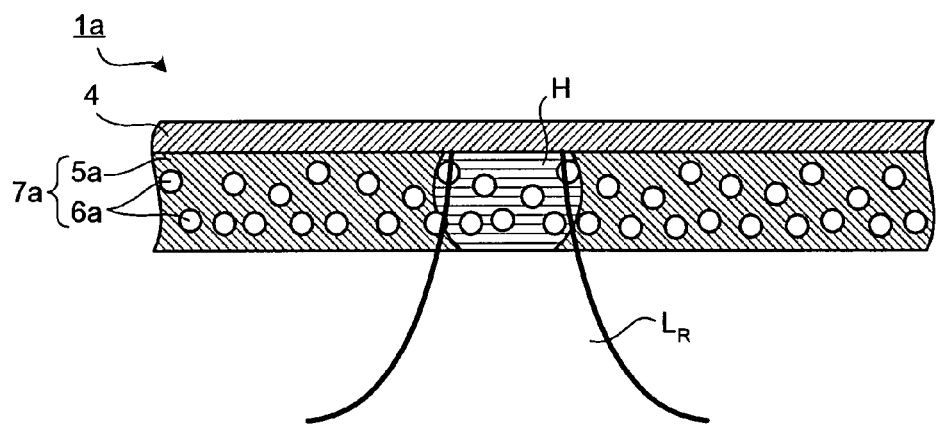
Figures 3, 10:
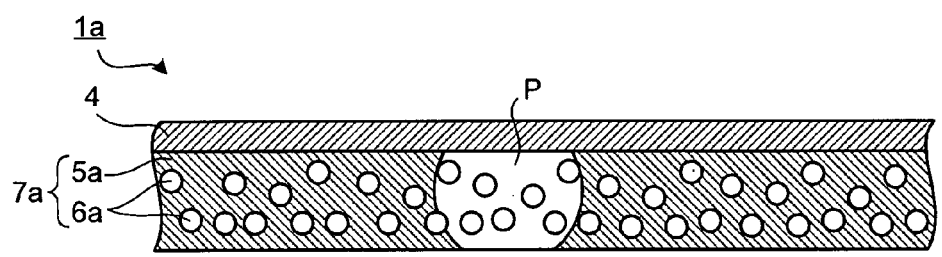

FIGS. 10-1 to 10-3 are schematic diagrams for explaining a process of forming a recording mark that carries information on an optical disk according to the second embodiment. In FIGS. 10-1 to 10-3, a substrate, a protective layer, and a label surface of an optical disk 1a are omitted, and it is needless to say that the structure of the optical disk 1a is similar to that of the optical disk 1. In an information recording layer 7a of the optical disk 1a, as shown in FIG. 10-1, for example, a dispersion material 6a that is solid and formed into particles from an organic dye is used as the heat-transfer restricting portions. The dispersion material 6a is configured as the dispersion material 6a is dispersed in a recording material 5a, which is, for example, an organic dye.

The recording material 5a that forms the information recording layer 7a included in the optical disk 1a according to the second embodiment is a material that is configured to decompose by being heated and to decrease its refraction index. Accordingly, the recording material 5a has a function of recording information on the information recording layer 7a. The recording material 5a has the dispersion material 6a dispersed therein, and becomes a parent phase of the information recording layer 7a.

Figure 11:
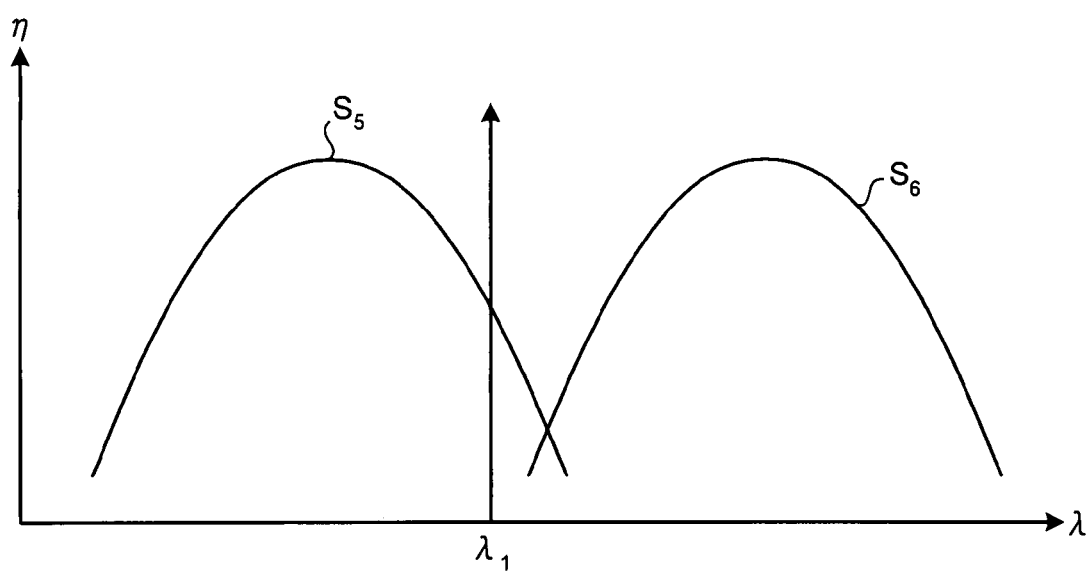
FIG. 11 is a chart for explaining a relation between wavelengths of recording light and optical absorptance of materials that form an information recording layer of the optical disk according to the embodiment.

FIG. 11 is a chart for explaining a relation between wavelengths of recording light and optical absorptance of materials that form the information recording layer of the optical disk according to the second embodiment. A solid line $S_5$ shown in FIG. 11 indicates a relation between optical absorptance of the recording material 5a and wavelengths, and a solid line $S_6$ indicates a relation between optical absorptance of the dispersion material 6a and wavelengths. As shown in FIG. 11, when the recording light with the wavelength $\lambda_1$ is irradiated, the optical absorptance η of the dispersion material 6a differs from that by the recording material 5a. As shown in FIG. 11, the optical absorptance η of the recording light by the dispersion material 6a is lower than that by the recording material 5a. In other words, the dispersion material 6a does not absorb the recording light with the wavelength $\lambda_1$. Even if the dispersion material 6a absorbs the recording light with the wavelength $\lambda_1$, an extent of absorption is extremely minute. Consequently, when the recording light with the wavelength $\lambda_1$ is irradiated to the information recording layer 7a, the recording material 5a absorbs the recording light and then generates heat, and its refraction index changes, but the dispersion material 6a does not generates, heat.

A thermal conductivity $\kappa_6$ of the dispersion material 6a is lower than a thermal conductivity $\kappa_5$ of the recording material 5a. As the recording light is irradiated to the information recording layer 7a, the recording material 5a generates heat. However, because the dispersion material 6a has a lower thermal conductivity than the recording material 5a, heat transfer from an area irradiated with the recording light to surrounding areas can be restricted. Accordingly, the dispersion of heat from the area irradiated with the recording light with the wavelength $\lambda_1$ can be suppressed, so that a recording mark finer than that on the conventional optical disk can be formed on the information recording layer 7a of the optical disk 1a according to the second embodiment. In the next description, a process of recording information on the information recording layer 7a of the optical disk 1a that includes the recording material 5a and the dispersion material 6a is explained.

As shown in FIG. 10-1, upon recording of information, the recording light $L_R$ with the wavelength $\lambda 1$ shown in FIG. 11 is irradiated to the information recording layer 7a. When the recording light $L_R$ is irradiated, the recording material 5a as the parent phase of the information recording layer 7a absorbs the recording light $L_R$ and then generates heat. Consequently, the recording material in an area irradiated with the recording light $L_R$ (area indicated by H in FIG. 10-2) is decomposed, and its refraction index is changed (decreased) relatively to that in areas on which the recording light $L_R$ is not irradiated.

Accordingly, the area irradiated with the recording light $L_R$ in the information recording layer 7a (area indicated by P in FIG. 10-3) becomes a recording mark. The recording mark has a different refraction index from that in an area on which the recording light $L_R$ is not irradiated, so that the recording mark can be identified by irradiating the information recording layer 7a with the reading light. In this way, information can be recorded on the information recording layer 7a of the optical disk 1a according to the second embodiment.

When the recording light $L_R$ is irradiated to the information recording layer 7a, and the recording material 5a generates heat, the thermal conductivity $\kappa_6$ of the dispersion material 6a is lower than the thermal conductivity $\kappa_5$ of the recording material 5a, and the dispersion material 6a hardly absorbs the recording light $L_R$, so that the dispersion material 6a hardly generates heat by the irradiation of the recording light $L_R$. Consequently, the dispersion of heat from the area irradiated with the recording light can be suppressed, and a fine recording mark (area indicated by P in FIG. 10-3) can be formed.

Examples of the dispersion material 6a and the recording material 5a, that form the information recording layer 7a of the optical disk according to the second embodiment include organic dye explained in the first embodiment, such as cyanine dye, diazo dye, and phthalocyanine dye. For example, in a case where the wavelength of the recording light is approximately 500 nanometers, a material that absorbs light with a peak wavelength of 400 nanometers to 480 nanometers, for example, a material expressed in Formula 2, can be used as the recording material 5a. As the dispersion material 6a, a material that hardly absorbs the recording light with the wavelength of approximately 500 nanometers, for example, a material expressed in Formula 1, which absorbs light with a peak wavelength of 620 nanometers to 700 nanometers, can be used.

To prevent heat, transfer through the recording material 5a, the recording material 5a can contain, for example, micro bubbles as the dispersion material 6a. Specifically, for example, a styrene material is used and made to contain a bubble smaller than a particle of the dispersion material 6a. Preferably, a plurality of bubbles is included in the dispersion material 6a. Alternatively, the dispersion material 6a and bubbles can be mixed and dispersed in the recording material 5a. Thus, the information recording layer 7a of the optical disk 1a according to the second embodiment can be configured by using two kinds of materials that absorb lights in different wavelength bands. In the above explanation, particles of the dispersion material 6a smaller than the diffraction limit of the reading light are dispersed in the recording material 5a. However, as the heat-transfer restricting portion, a bubble of which maximum dimension is smaller than the diffraction limit of the reading light can be formed in the recording material 5a. Preferably, a plurality of bubbles is formed and dispersed in the recording material 5a.

According to the second embodiment, the exothermic material 6 as explained in the first embodiment, which absorbs the recording light and then generates heat, and has the external dimension smaller than the diffraction limit of the reading light (see FIG. 1), can be further dispersed in the information recording layer 7a. In this way, heat generation sources are scattered, the total amount of heat generation can be reduced from that generated on the conventional one, and heat transfer from the recoding-light irradiated area to the outside of the irradiated area can be restricted, so that a fine recording mark can be formed by more effectively reducing the dispersion of heat to the outside of the recoding-light irradiated area.

As described above, according to the second embodiment, the information recording layer 7a of the optical disk 1a includes the recording material 5a and the heat-transfer restricting portions (the dispersion material 6a). The recording material 5a absorbs the recording light for recording information and then generates heat. On the recording material 5a, information is recorded as the light refraction index changes due to the heat generation. The dispersion material 6a is dispersed in the recording material 5a, and has lower absorptance of the recording light than the recording material, an external dimension smaller than the diffraction limit of the reading light for reading information, and a lower thermal conductivity than the recording material.

Thus, the dispersion of heat from the recording-light irradiated area to areas on which the recording light is not irradiated can be restricted, so that a recording mark finer than that on the conventional optical disk can be formed. Moreover, according to the second embodiment, a fine recording mark can be formed without changing the wavelength of the recording light, the aperture of a lens that forms an optical system, and the like. Accordingly, configurations of a light source and a device do not need to be changed, so that high density recording can be achieved by forming fine recording marks without changing the design of a recording device.

INDUSTRIAL APPLICABILITY

As described above, the information recording layer of an optical disk and the optical disk according to the present invention are useful for high density recording and, particularly, are suitable for achieving high density recording by forming fine recording marks.

The invention claimed is:
1. An information recording layer of an optical disk, comprising:
   a recording material that absorbs recording light for recording information and generates heat, and on which information is recorded as a light refraction index changes due to generated heat; and
   heat-transfer restricting particles that have lower absorptance of the recording light and lower thermal conductivity than the recording material, each of the particles having an external dimension smaller than a diffraction limit of reading light for reading information, the heat-transfer restricting particles being dispersed in the recording material.

2. The information recording layer according to claim 1, wherein the heat-transfer restricting particles contain bubbles.

3. The information recording layer according to claim 1, wherein each of the heat-transfer restricting particles is a bubble having an external dimension smaller than the diffraction limit of the reading light.

4. The information recording layer according to claim 1, wherein exothermic particles that absorb the recording light and generate heat, each of the exothermic particles having an external dimension smaller than the diffraction limit of the reading light, are dispersed in the recording material.

5. An optical disk comprising:
   an information recording layer that includes
      a recording material that absorbs recording light for recording information and generates heat, and on which information is recorded as a light refraction index changes due to generated heat; and
      heat-transfer restricting particles that have lower absorptance of the recording light and lower thermal conductivity than the recording material, each of the particles having an external dimension smaller than a diffraction limit of reading light for reading information, the heat-transfer restricting particles being dispersed in the recording material;
   a substrate that has the information recording layer on a surface thereof;
   a reflective layer formed on a surface of the information recording layer; and
   a protective layer formed on a surface of the reflective layer.

\* \* \* \* \*